United States Patent
Risser et al.

(10) Patent No.: US 12,370,777 B2
(45) Date of Patent: Jul. 29, 2025

(54) AIRCRAFT SEEKER WINDOWS AND AIRCRAFT WINDOW SYSTEMS INCLUDING THE SAME

(71) Applicant: Battelle Memorial Institute, Columbus, OH (US)

(72) Inventors: Steven M. Risser, Reynoldsburg, OH (US); Amy Marie Heintz, Pacific Grove, CA (US); Rachel M. Thurston, Columbus, OH (US); John Bartholomew, Hilliard, OH (US); Erica Howard, Columbus, OH (US); Richard G. Rateick, Jr., South Bend, IN (US); Ian Haggerty, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 173 days.

(21) Appl. No.: 17/872,296

(22) Filed: Jul. 25, 2022

(65) Prior Publication Data
US 2023/0045928 A1 Feb. 16, 2023

Related U.S. Application Data

(60) Provisional application No. 63/227,324, filed on Jul. 29, 2021.

(51) Int. Cl.
*B64C 1/14* (2006.01)
*B32B 7/027* (2019.01)
(Continued)

(52) U.S. Cl.
CPC ............ *B32B 17/061* (2013.01); *B32B 7/027* (2019.01); *B32B 7/12* (2013.01); *B32B 9/002* (2013.01);
(Continued)

(58) Field of Classification Search
CPC ......... B64C 1/484; F41G 7/2293; B32B 7/12; B32B 9/002; B32B 9/007; B32B 9/04; B32B 15/02; B32B 18/00
(Continued)

(56) References Cited

U.S. PATENT DOCUMENTS

| | | | |
|---|---|---|---|
| 5,935,723 A * | 8/1999 | Borden | G02B 1/115 359/359 |
| 2015/0253117 A1* | 9/2015 | Naka | F42B 30/006 244/119 |
| 2016/0221680 A1* | 8/2016 | Burton | H02K 3/522 |

FOREIGN PATENT DOCUMENTS

| | | | |
|---|---|---|---|
| CN | 103687462 A | * | 3/2014 |
| CN | 104339786 A | * | 2/2015 |

OTHER PUBLICATIONS

Machine_English_translation_CN_104339786_A; Chen et. al.; A core material with a lamination structure and an infrared absorption function and a preparing method thereof; Feb. 11, 2015; EPO; whole document (Year: 2024).*

(Continued)

*Primary Examiner* — Tahseen Khan
(74) *Attorney, Agent, or Firm* — Grossman, Tucker, Perreault & Pfleger, PLLC; Donald G. Weiss

(57) ABSTRACT

An approach to seeker windows for aircraft comprises a window layer comprising an IR transparent material, the window layer comprising a first side and a second side substantially opposite the first side; and a heating layer on the first side or the second side of the window layer, the heating layer configured to apply a heating profile to the window layer to reduce thermal shock imparted to the window layer when the seeker window is exposed to hypersonic flight conditions.

20 Claims, 12 Drawing Sheets

(51) Int. Cl.
   *B32B 7/12* (2006.01)
   *B32B 9/00* (2006.01)
   *B32B 9/04* (2006.01)
   *B32B 15/02* (2006.01)
   *B32B 17/06* (2006.01)
   *B32B 18/00* (2006.01)
   *F41G 7/22* (2006.01)
   *H05B 3/86* (2006.01)
   *H05B 3/84* (2006.01)
(52) U.S. Cl.
   CPC .............. *B32B 9/007* (2013.01); *B32B 9/04* (2013.01); *B32B 9/041* (2013.01); *B32B 15/02* (2013.01); *B32B 18/00* (2013.01); *F41G 7/2293* (2013.01); *H05B 3/86* (2013.01); *B32B 2255/205* (2013.01); *B32B 2307/30* (2013.01); *B32B 2307/302* (2013.01); *B32B 2307/412* (2013.01); *B32B 2605/18* (2013.01); *F41G 7/2253* (2013.01); *H05B 3/84* (2013.01)

(58) Field of Classification Search
   USPC ............................................................ 428/98
   See application file for complete search history.

(56) References Cited

OTHER PUBLICATIONS

Machine_English_translation_CN_103687462_A; Jiang et. al.; Wise-Spectrum electromagnetic shielding window; Mar. 26, 2014; EPO; whole document (Year: 2024).*

* cited by examiner

AIRCRAFT SEEKER WINDOWS AND AIRCRAFT WINDOW SYSTEMS INCLUDING THE SAME

CROSS-REFERENCE TO RELATED APPLICATIONS

The present application claims the benefit of the filing date of U.S. Provisional Application Ser. No. 63/227,324, filed Jul. 29, 2021, the entire teachings of which application is hereby incorporated herein by reference.

TECHNICAL FIELD

The present disclosure relates to aircraft seeker windows and aircraft window systems including the same.

BACKGROUND

Many aircraft, such as airplanes, helicopters, unmanned vehicles, and missiles (e.g., infrared (IR) seeking missiles), include a seeker that utilizes IR radiation to track one or more targets. In the example of a missile, the seeker typically includes an IR sensor that is positioned within the body of the missile (e.g., in the nose cone) and which is oriented to detect IR radiation through a seeker window that is at least partially transparent to such radiation. The seeker window can be subject to very high heat loads from the compressed air during flight, resulting in a significant temperature gradient across the seeker window. That temperature gradient can impart significant thermal stresses to the seeker window, potentially leading to failure of the seeker window and destruction and/or malfunction of the aircraft.

There is now a desire for aircraft that include IR tracking capability, and which are capable of withstanding hypersonic flight at speeds ranging from Mach 1 to Mach 20. At such operating conditions, the seeker window will be subject to high heat loads (and thus, high temperature gradients) as the speed of the aircraft increases. If the seeker window cannot withstand such conditions, it may catastrophically fail, resulting in loss or malfunction of the aircraft. Existing seeker window materials such as sapphire and aluminum oxynitride have been studied as potential materials for use as a hypersonic IR window due to their good thermal resistance and transparency to IR radiation in wavelength ranges of interest. However, such materials do not perform well as a seeker window at hypersonic conditions due to the thermal shock (temperature gradients in the material) that is imposed on the material during flight at such conditions, which can impose thermal stress on the window that exceeds the strength of such materials. Fused silica is another material that has been considered for use as an IR window material at hypersonic conditions. While fused silica has been shown to have enough strength to withstand the thermal shock and stress that may be imposed on it during a short hypersonic flight, its IR transparency may be limited to the near infrared region (generally, less than 2 μm). As a result, fused silica may be unsuitable for use with IR seekers that utilize longer wavelength (>2 μm) IR radiation.

Thus, a need remains in the art for IR windows and window systems that have desirable performance when subject to hypersonic flight conditions. The present disclosure is aimed at such need.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings.

DETAILED DESCRIPTION

Figure 1:
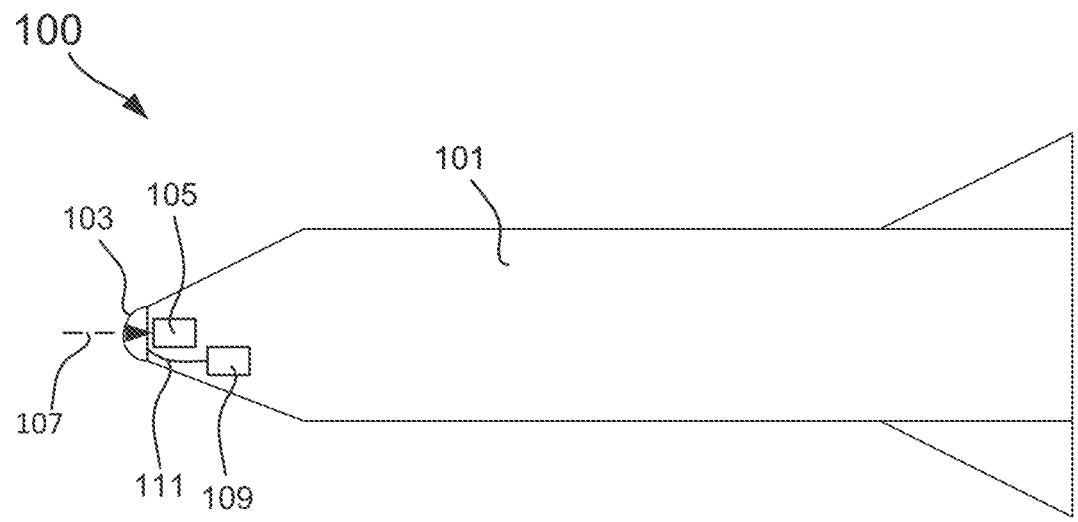
FIG. 1 is an example of a missile including seeker window consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Aspects of the present disclosure relate to seeker windows and aircraft window systems including the same. In embodiments and as will be described in further detail below, seeker windows consistent with the present disclosure may include a window layer that includes an infrared (IR) transparent material, a first side, and a second side that is substantially opposite the first side. The seeker windows described herein further include a heating layer on the first side, the second side, or both the first and second sides. The heating layer(s) is/are configured to apply a heating profile to the window layer to reduce the thermal shock imparted to the window layer when the IR seeker window is exposed to hypersonic flight conditions. In embodiments the IR transparent material is a material that transmits ≥about 50% of light in a wavelength range of 0.4 to 5.0 microns (μm), and preferably transmits ≥about 65% of light in that wavelength range.

In some embodiments the IR transparent material is selected from a group consisting of sapphire, yttria ($Y_2O_3$), zinc sulfide (ZnS), aluminum oxynitride (AlON), spinel, beta silicon carbide (β-SiC), fused silica, germanium, gallium arsenide (GaAs), diamond, magnesium oxide (MgO), yttria stabilized zirconia (YSZ), yttria aluminum garnet (YAG), magnesia-yttria (MgO—$Y_2O_3$), $Al_2O_3$—YSZ, $Al_2O_3$—YSZ—$Y_2O$, YTZP (Yttria stabilized zirconia polycrystal), and combinations of two or more thereof.

In embodiments the heating layer comprises a heating mesh, a heating coating, or a combination thereof. In such instances the heating mesh, heating coating, or combination thereof includes titanium (Ti), silver (Ag), tungsten (W), carbon nanotubes (CNTs), or a combination of two or more thereof.

In embodiments the window layer has a first coefficient of thermal expansion (CTE), and the heating layer has a second CTE, wherein the first CTE and second CTE differ by less than or equal to 10%. In embodiments the first CTE is in a range of 3.8 to 11.8 $10^{-6}$/K (reciprocal or inverse kelvin).

In embodiments the seeker windows further include a heat distribution layer on the first side, the second side, or both the first and second sides of the window layer. In such embodiments the heat distribution layer may be between the window layer and the heating layer. Alternatively, or additionally, the heating layer may be between the window layer and the heat distribution layer.

As noted above, additional aspects of the present disclosure relate to aircraft window systems. In embodiments the aircraft window systems include a housing that includes an opening and a seeker window in the opening. The seeker window includes a perimeter surface, and the aircraft window systems further include a seal (e.g., a thermally conductive seal) between the perimeter surface and the housing. As the configuration of the seeker window in the aircraft window systems is generally the same as described above, it is not reiterated for the sake of brevity. In embodiments, the seal is configured to conduct heat from the seeker window to the housing. In specific non-limiting embodiments, the seal includes, consists of, or consists essentially of flexible graphite or high entropy metal alloys. In other embodiments, the window may be bonded directly to the seal via methods known in the art such as brazing.

The seeker windows consistent with the present disclosure include a window layer and a heating layer that is configured to impart a heating profile to the window to reduce thermal shock imparted to the window layer when the window is exposed to hypersonic flight conditions. Notably, the heating layer can reduce the thermal shock (and potentially hotspot development) imposed on the window layer by imparting the heating profile to the window layer before the seeker window is exposed to the rapid heating that occurs as the aircraft accelerates to hypersonic flight within an atmosphere. More particularly, the thermal profile is designed to reduce the thermal gradient (shock) within the window layer when an atmosphere facing surface of the seeker window or rapidly heated, e.g., during hypersonic flight.

In embodiments, the seeker windows described herein further include a heat distribution layer. The heat distribution layer may be on the heating layer, between the heating layer and the window layer, or both. Alternatively, or additionally, the heating layer may be on the first side of the window layer, and the heat distribution layer may be on the second side of the window layer. In general, the heat distribution layer may function to reduce or limit the development of "hot spots" within the seeker window, e.g., by distributing thermal load over all or a portion of a surface of the seeker window.

Additional aspects of the present disclosure relate to aircraft window systems that include seeker windows consistent with the present disclosure. In embodiments the aircraft window systems include a housing with an opening that is configured to receive a seeker window consistent with the present disclosure. In such instances the seeker window (or the window layer therein) may have a perimeter surface, and the window systems may further include a thermally conductive seal that is present between at least a portion of the perimeter surface and the housing when the seeker window is located within the opening in the housing. Without limitation, in embodiments the thermally conductive seal is configured to convey heat away from the seeker window to reduce thermal load on the seeker window during hypersonic flight.

As used herein, the term "aircraft" means any machine capable of flight. Non-limiting examples of aircraft include airplanes, helicopters, missiles, unmanned aerial vehicles (UAVs), combinations thereof, and the like. Without limitation, the seeker windows and aircraft window systems are particularly suitable for use with aircraft that are capable of hypersonic flight, particularly hypersonic missiles, and hypersonic airplanes.

As used herein the term "hypersonic" when used in conjunction with flight, means flight at greater than or equal to the speed of sound in air.

As used herein the term "transparent" when used in conjunction with a layer, coating, or other structure (e.g., a seeker window), means that the layer, coating, or other structure transmits greater than or equal to about 50% of light (or even ≥about 65%) in all or a portion of an indicated region of the electromagnetic spectrum. For example, "IR transparent" means that a layer, coating, or other structure transmits greater than or equal to 50% (e.g., ≥65%) of incident light in all or a portion of the infrared (IR) region of the electromagnetic spectrum. In embodiments, IR transparent means that the layer, coating, or other structure transmits greater than or equal to 50% (e.g., ≥65%) of light in a wavelength range of 0.4 to 5 μm.

As used herein, the term "thermal gradient" when used with reference to a window, layer, or other structure, means the difference in temperature at a first side of the window, layer, or other structure, and the temperature at a second side of the window, layer, or other structure that is substantially opposite the first side.

As used herein, the term "about" when used in conjunction with a value or a range, means+/−5% of the indicated value or +/−5% of the endpoints of the indicated range.

The term "on" may be used herein to denote a position of a first component or first layer relative to a second component or second layer. For example, the instant specification may indicate that a first layer is "on" a surface of a second layer. In such instances it should be understood that the first layer is above the surface of the second layer but is not necessarily in direct contact with that surface. In contrast, the term "directly on" is used herein to indicate that one layer or component is in direct contact with a surface of another layer or component, i.e., with no intervening components or layers between the components/layers indicated to be in direct contact with one another.

FIG. 1 is one example of an aircraft that includes a seeker window consistent with the present disclosure. As shown, aircraft 100 is in the form of a missile that includes a body 101 and a seeker window 103 in the form of a radome at a front (or nose) portion of body 101. Aircraft 100 further includes an IR seeker 105 within the body 101. The seeker window 103 is transparent to at least a portion of light 107 within the IR region of the electromagnetic spectrum. For example, seeker window 103 may be configured to be IR transparent in a wavelength range of 0.4 to 5.0 µm. In any case, IR seeker 105 is configured to receive IR light transmitted through seeker window 103 and use such light, for example, to track one or more targets. The example of FIG. 1 also shows power source 109, which is an optional power source for a heating layer, and optional busbars 111, which electrically connect the power source 109 to the heating layer.

Figure 2:
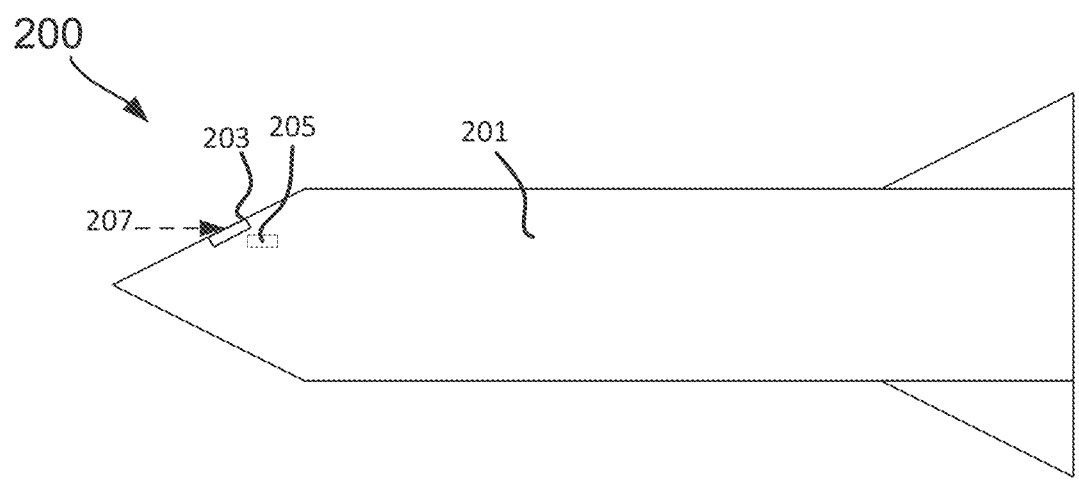
FIG. 2 is another example of a missile including seeker window consistent with the present.

FIG. 2 is another example of an aircraft that includes a seeker window consistent with the present disclosure. As shown, aircraft 200 is in the form of a missile that includes a body 101 and a seeker window 203 on a nose portion of body 101. Like seeker window 103, seeker window 203 is configured to transmit at least a portion of light within the IR region of the electromagnetic spectrum. Unlike seeker window 103, however, seeker window 203 is flat or substantially flat, and may lie on or within a plane of a surface of the nose or other portion of body 201. Seeker window 203 is otherwise configured in the same manner as seeker window 103, in that it is configured such that it is IR transparent in a wavelength range of interest, such as but not limited to 0.4 to 5.0 µm. Aircraft 200 further includes an IR seeker 205, which is configured to receive IR light 207 transmitted through seeker window 203, and to use such light, e.g., to track one or more targets.

For the sake of example and ease of illustration, FIGS. 1 and 2 depict aircraft 100 and aircraft 200 in the form of a missile. Such a configuration is not required, however, and aircraft 100 and aircraft 200 may have any suitable shape or configuration. For example, aircraft 100 and aircraft 200 may be in the form of an airplane, helicopter, unmanned aerial vehicle, missile, a combination of two or more thereof, or the like. Without limitation, in embodiments aircraft 100 is preferably in the form of a missile. Similarly, seeker windows 103 and 203 are not limited to the configurations shown in FIGS. 1 and 2 and may have any suitable shape.

Figure 3:
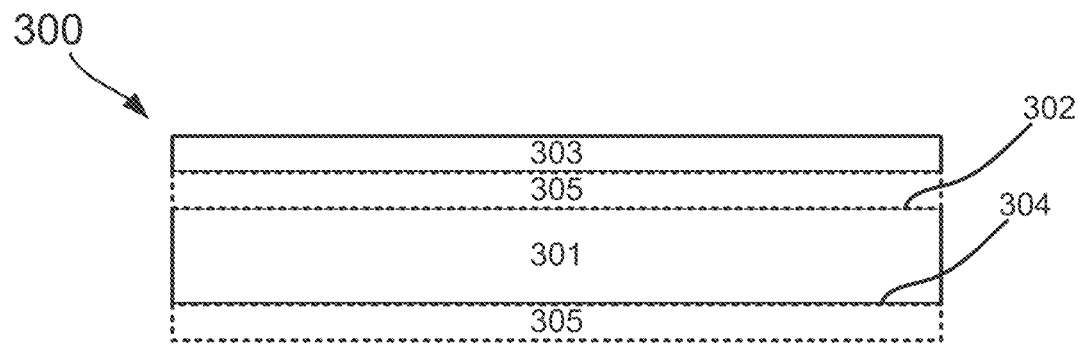
FIG. 3 is a cross section of one example of a seeker window consistent with the present disclosure.

FIG. 3 is a cross section of one example of a seeker window consistent with the present disclosure. As shown, seeker window 300 includes a window layer 301 and heating layer 303. Window layer 301 includes a first side 302 and a second side 304 substantially opposite first side 302. In this embodiment heating layer 303 is formed on the first side 302, but as will be described later heating layer 303 may be positioned differently. In embodiments, first side 302 is an atmosphere facing side of window layer 301, and second side 304 is an inward facing side of window layer 301. In such instances, first side 302 is configured to face towards an atmosphere when seeker window 300 is installed in an aircraft. In contrast, second side 304 is configured to face towards the aircraft when seeker window 300 is installed therein. Seeker window 300 may include one or more optional heat distribution layers 305, which may be present on (e.g., directly on) first side 302 and/or second side 304 of window layer 301. Among other things, heat distribution layers 305 may be configured to distribute heat (from an applied thermal profile and/or generated during flight) across a surface of first side 302 and/or second side 304 of window layer 301.

Several methods may be employed to couple the layers, including window layer 301, heating layer 303, and optional heat distribution layer 305. In some embodiments, a tie layer, e.g., titanium, may be used for metallic coatings. In other embodiments, intermolecular forces such as van der Waals and electrostatic forces may be used for CNT coatings. In yet other embodiments, an adhesive may be used In these embodiments, the adhesive chosen must be capable of surviving the heater temperatures and may not decrease transparency below the threshold of 50% defined above. In the embodiments utilizing a tie layer, e.g., titanium, the titanium tie layer is functionally acting like an adhesive by helping to bond the layers together. In some embodiments, the layers may be coupled using a diffusion bonding method as described later.

Window layer 301 may be made up of any suitable material. In embodiments, window layer 301 is formed from an IR transparent material, and particularly an IR transparent material that can transmit at least 50% (e.g., ≥65%) of IR light in a wavelength range of about 0.4 to about 5.0 µm. The IR transparent material preferably also has thermal properties that render it suitable for use in hypersonic applications. Non-limiting examples of thermal properties of the IR transparent material used as or in window layer 301 include IR transmission range, change in refractive index versus temperature (dn/dT), durability (e.g., hardness, strength, fracture resistance, impact resistance, etc.), thermal shock resistance (represented by a thermal shock figure of merit), thermal conductivity (Tc), and CTE. Non-limiting examples of suitable materials that may be used as or in window layer 301 include sapphire, yttria ($Y_2O_3$), ZnS, AlON, spinel, fused silica, germanium, GaAs, diamond, MgO, yttria stabilized zirconia (YSZ), yttria aluminum garnet (YAG), MgO—$Y_2O_3$, $Al_2O_3$—YSZ, $Al_2O_3$—YSZ—$Y_2O$, AlN, $Si_3N_4$ and combinations thereof. Thermal and other properties of some of such materials are provided in Table 1 below.

TABLE 1

Properties of Example Materials Suitable for Use as a Window Layer

| Material | $T_c$* (W/m*K$^{-1}$) | CTE** (10$^{-6}$/K) | Dn/dT*** (10$^{-6}$/K) | Strength (MPa) | IRT**** (μm) | Thermal Shock FOM |
|---|---|---|---|---|---|---|
| Sapphire (Al$_2$O$_3$) | 32-42 | 5.0-6.6 | — | 700 | 0.2-4.7 | 4.3-9.7 |
| Yttria (Y$_2$O$_3$) | 7-15.1 | 6.5-7.1 | 30 | 72-292 | 0.2-11 | .68-2.41 |
| ZnS | 27 | 6.5 | 40 | 60-90 | 0.35-14 | 2.6 |
| AlON | 9.6-12.6 | 5.8 | 3 | 300 | 0.2-4.5 | 1.5 |
| Spinel | 14.6-18 | 5.6 | 3 | 100-200 | 0.2-5 | 1.1-1.9 |
| Ge | 60 | 5.9 | 400 | 90.100 | 1.8-100 | 6.8 |
| GaAs | 53 | 5.7 | 150 | 130 | — | 8.02 |
| Diamond (CVD) | 2000 | 1.0 | 4.04 | 200-400 | — | — |
| Si (fused) | 163 | 3 | 170 | — | 1.1-10 | 31 |
| MgO | 51 | 11.8 | — | 100-250 | — | 1.1-2.9 |
| YSZ | 3.2 | 10.6 | — | 1888 | 2-10 | 2.1 |
| YAG | 10.7-13 | 5.9 | 7.4 | 339-378 | 0.2-6 | — |

*Thermal conductivity in Watts per meter-kelvin (W/m*K$^{-1}$)
**Coefficient of thermal expansion in 10$^{-6}$/Kelvin (K)
***Change in refractive index versus temperature in 10$^{-6}$/K
****Infrared transmission range in microns Heating layer 303 is generally configured to impart a thermal profile to window layer 301, e.g., before, during, or after launch of an aircraft into which seeker window 300 is installed. For example, when seeker window 300 is installed in a missile, heating layer 303 may be configured to impart a thermal profile to window layer 301 prior to launch of the missile. As used herein, the term "thermal profile" refers to increasing the temperature of at least a portion of window layer 301 so as to reduce the amount of thermal shock experienced by window layer 301 when seeker window 300 is subject to hypersonic flight conditions. In embodiments, application of a thermal profile may involve heating one or more surfaces of window layer 301, e.g., with one or more heating pulses. Such pulses may be applied continuously, intermittently, or in a designated pattern to all or a portion of a surface (e.g., first side 302, second side 304) of window layer 301. In embodiments, application of the thermal profile reduces the difference between the temperature of the interior of window layer 301 and the temperature at the first surface of window layer 301 when seeker window 300 is accelerated to hypersonic speeds or otherwise subject to hypersonic flight conditions. Put differently, application of the thermal profile to window layer 301 can reduce or narrow thermal gradients that develop between first side 302 and second side 304 during hypersonic flight or acceleration to hypersonic speed. By reducing or narrowing the thermal gradient, seeker window 300 may be subject to a reduced level of thermal shock when it is accelerated to or flown at such speeds, as compared to a level of thermal shock that it would be subjected to if the thermal profile were not applied.

As noted above, heating layer 303 is configured to apply a thermal profile to window layer 301 to reduce the impact of thermal shock to the seeker window 300. For example, heating layer 303 may be designed to achieve a desired temperature setpoint that will reduce the difference between the temperature of the window layer 301 and the external temperature seeker window 300 is exposed to as it is accelerated to hypersonic flight. To achieve that setpoint, one or more busbars, e.g., busbars 111 from FIG. 1, may be used to deliver electrical power to heating layer 303. The power may be supplied from the aircraft or from another power source. For example, power to the busbars may be provided by the aircraft, which may have an onboard power supply that is capable of providing electrical power at a suitable voltage, such as about 24 to about 36 volts DC. At fixed voltage, the heat output of heating layer 303 is proportional to the square of the applied voltage and inversely proportional to the resistance of the heating layer 303. Preferably, the heat output is balanced against heat losses due to thermal convection into the environment, thermal conduction into the structure, and ohmic (resistive heating) losses at the busbars. Resistive heating loss can be minimized across the busbars by using busbars that have a larger diameter/thickness (and therefore lower resistance) than heating layer 303, and by appropriate interface design. The resistance of heating layer 303 is defined by the effective sheet resistance of the heating layer 303 (e.g., the coating or mesh making up the layer), as well as the configuration of the busbars. The resistance of the heating layer 303 and busbars can be reduced by increasing the thickness of the coating and/or the density of the mesh making up the heating layer 303, and by reducing the distance between the busbars. As those changes can affect transparency of the heating layer 303, it may be desired to design heating layer 303 and the busbars to achieve a desired balance between suitable resistance and transparency in the wavelength range(s) of interest.

Metal foil and metal braids are commonly used in the industry as busbars. A contact can be made by attaching the lead to the window layer 301 using an adhesive. However, in the case of CNT heating elements, the sharp interface made between the metal and the heating element creates hot spots during powering. Furthermore, the epoxy tends to spread onto portions of the lead, creating a non-uniform contact. These problems can be ameliorated by using a hybrid contact. A hybrid contact is defined as a contact composed of multiple functional materials. For example, an electrode material, a structural adhesive, and an electrical interface materials. The electrical interface material connects the electrode and the CNTs—it is a transition material that is a conductive adhesive, such as silver epoxy. The silver epoxy serves to soften the sharp interface between the thin CNT heating element (approximately 0.5 um to 10 um thick) and the relatively tall metal lead (up to 150 um thick).

It may also serve as a structural adhesive. It further serves to prevent corrosion of the copper (Cu) leads.

In embodiments the lead may be a metal foil or braid conductor that can be selected based on engineering guidelines for the current load, to prevent heating at the environmental conditions. A preferred material is Cu having a thickness of 0.005 inch (120 um) or less and width that is less than 0.1 inch. The lead can be attached to the window layer 301 using a structural adhesive. Preferred adhesives are thixotropic, to prevent wicking onto the lead, and selected so that curing temperature is compatible with window layer 301. The preferred adhesive is an epoxy with a high thermal stability and a glass transition temperature (Tg) greater than 45° C. Conductive adhesives may also be used, provided they have good adhesive bonding between the Cu and the window layer 301.

Once the structural adhesive (preferably an epoxy) is cured, the electrical interface material may be created by feathering a conductive adhesive along the outer edges of the Cu lead. By feathering, it is meant that the material forms a smooth slope from the tall Cu lead to the window layer 301. Smooth is defined as a transition that does not have substantial square edges, mask lines, jagged edges, or irregularities. Investigation under a microscope would show that the entire contact line along the lead interface is tapered from the highest edge of the lead to the window layer 301. Smoothing may also be accomplished by lightly sanding the edge.

Appropriate conductive adhesives have resistivity less than 0.01 ohms centimeter (Ωcm). Preferred adhesives have Tg higher than 45° C. and may be cured below 65° C. This conductive adhesive creates a uniform, soft interface with the CNT heater element. Soft refers to the fact that these adhesives can furthermore act as cushion for the mismatch in coefficient of thermal expansion of the components. For thin film systems (Cu leads are preferably less than 75 um beneath the surface), it is insufficient to use an Ag adhesive at the lead-heater interface. However, the complete encapsulation of the Cu lead edges provides a material that is corrosion resistant. The hybrid interfaces may then be coated with CNT paint. Further details concerning example busbars and mechanisms that can implemented with the heating layers 303 described herein to achieve a desired temperature setpoint are described in U.S. application Ser. No. 14/988,742 (U.S. Pre-Grant Publication No. 2016/0221680), which is expressly incorporated herein by its entirety As an example, in embodiments heating layer 303 may be or includes a metallic mesh with a sheet resistance of 0.015-0.02 ohms/square, while also being transparent to IR light. (Ohms/square is the standard unit of sheet resistance of a thin film, typically measured by a 4-point probe. Sheet resistance is defined as the resistivity of the material (in ohm*meters) divided by the thickness of the film (in meters)). Alternatively, heating layer 303 may be in the form of or include a continuous CNT coating with a sheet resistance of 1 ohm/square while remaining transparent to IR light. Still further, heating layer 303 may be in the form of or include a patterned mesh of CNTs that has a sheet resistance of 0.2 ohm/square, while remaining transparent to IR light. These sheet resistances are sufficient to achieve the required power to pre-heat the window layer 301 (or, more generally, seeker window 300) to a desired thermal setpoint, i.e., the temperature required to prevent damage from thermal shock, and limit or prevent thermal shock to window layer 301. Since the power and temperature required to prevent thermal shock will vary with the size, thickness, and material of the window, the desired thermal setpoint is determined in advance based on the particular requirements for seeker window 300. For example, in one configuration of seeker window 300, a power of 240 watts (W) and a temperature of at least 600 degrees Celsius (° C.) was required to avoid thermal shock.

Further non-limiting examples of suitable materials that can be used as or in heating layer 303 and methods of forming heating layer 303 include the materials and methods described in U.S. Pat. No. 10,226,789, the entire content of which is expressly incorporated by reference herein. Of particular note are the transparent CNT films and methods of forming transparent CNT films described in the '789 patent, which are particularly useful in forming heating layers consistent with the present disclosure.

A non-limiting example of methods of forming thin films of CNTs follows. In this method, carbon nanotubes are dispersed in a superacid solution and laid down on a substrate to form a conductive and transparent CNT network film. The superacid, in its deprotonated state, is an anion that has a permanent dipole moment. The superacid solution may be a pure superacid or have additional solvent. In this example method, a reversible charge transfer complex is formed that solubilizes the CNTs in non-nucleophilic solvents.

In order to overcome the large van der Waals interactions that destabilize dispersions and cause re-bundling during film formation, a repulsive force is introduced by forming a complex between a charged CNT and non-covalently bonded charged species. This complex is electrically neutral, and no net coulombic force exists between charged particles separated by large distances. At shorter distances, the diffuse portions of the double layers interpenetrate, giving rise to a repulsive interaction. The distance over which this overlap occurs depends on the thickness of the double layer and the surface potential.

In one example, a CNT network film comprising a tangled mass of CNT bundles in the form of a film is disposed on a substrate. The CNT bundles have a sheet resistance of 5000 ohms/square or less. In another example, a method of forming a CNT network film comprises dispersing CNT bundles in a superacid to form a liquid composition of dispersed CNTs. The liquid composition of the dispersed CNTs is deposited onto a substrate, and the superacid is removed. One process for preparing films in this example involves selecting a CNT, forming a charge transfer complex with superacid, dispersing in a dispersing medium, forming an initial CNT network film on a substrate (the substrate can be nonporous or could be a filter), and coagulating the debundled CNT structure using a nonaqueous non solvent.

In embodiments, heating layer 303 is or includes a coating or patterned mesh of CNTs, wherein the coating or patterned mesh is IR transparent in a wavelength range of 0.4 to 5 μm. A transparent coating of CNTs may be deposited on a surface of window layer 301, for example, by applying a solution containing CNTs to a surface of window layer 301, drying the solution (e.g., using air-drying or vacuum) to form a coating of CNTs, which may also be called a CNT network. If desired, the coating can be patterned, e.g., using lithography, to create a mesh of CNTs on the surface of window layer 301. Alternatively, a CNT coating may be prepared by passing a dispersion through a membrane filter, such as 0.02 um Anodisc, washed to remove any dispersing agents, and then transferred to the window.

One example method of forming a CNT coating that can be used to producing a heating layer consistent with the present disclosure follows. The first step in the process is assembling the nanotube network. Single wall carbon nanotubes (SWNTs) with a specified diameter in the range of 1.2-1.7 nm and length in the range of 100 nm-4 µm are selected. Nanotubes are suspended in a surfactant solution at 1 mg/100 ml and the stock solution is then mixed with deionized water and 1% weight/volume (w/v) sodium dodecyl sulfate, for a final concentration of 6 µg/100 ml.

The solution is vacuum filtered over a cellulose membrane with, for example, a 0.05 µm pore size. The vacuum filtration method self-regulates the deposition rate of nanotubes on the membrane to produce an evenly distributed conductive network. The thickness of this film is controlled by the volume of dispersion that is collected. The surfactant can be removed from the CNT network by washing with water.

Transfer of the CNT film from the filter to the window can also be achieved by light pressure contact between the surface of the CNT coating on the membrane filter and the window. Alternatively, transfer can be achieved by floating the CNT coating off onto water and picking up with the window, as is known in the art.

More generally, heating layer 303 may be configured to heat window layer 301 in any suitable manner. In embodiments heating layer 303 is or includes a resistive heating material that can generate heat in response to an applied stimulus, such as an applied electric voltage or signal. In such instances, heating layer 303 may be communicatively coupled to a controller and a power source, e.g., power source 109 from FIG. 1, wherein the controller is configured to cause heating layer 303 to apply a thermal profile to window layer 301. For example, the controller may transmit or cause the transmission of electric voltage from the power source to heating layer 303. In response, heating layer 303 may generate heat which may be conveyed to a surface of window layer 301 in any suitable manner, such as by thermal convection, conduction, radiation, or the like.

In embodiments heating layer 303 is manufactured from one or a combination of materials that can generate heat in response to an applied signal such as an applied electric current. For example, in embodiments heating layer 303 may be in the form of or include a continuous layer of heating material that can produce heat via resistive heating or in another suitable manner. Alternatively, or additionally, heating layer 303 may include a mesh (e.g., a metallic mesh) of heating material that can produce heat via resistive heating or in another suitable manner.

As noted above heating layer may be configured to apply a desired thermal profile to window layer 301. In embodiments the thermal profile may be characterized by a target temperature that is achieved by heating layer 303. The target temperature may vary based on the application, and any suitable target temperature may be employed. In embodiments the target temperature is in a range of about 400° C. to about 700° C., depending on the mechanical properties of seeker window 300 (which dictates critical stresses that can be achieved) and the outer maximum air temperature. In embodiments the material(s) used to form heating layer 303 is/are selected to have a desired level of thermal stability at temperatures in excess of 1000° C., such as from 1000-1400° C. or more specifically at about 1200° C.

As used herein, the term "thermal stability" means retention of electrical and mechanical stability for the seeker window 300. This may be determined in laboratory tests by measuring the resistance at expected operating temperatures, such as by placing the material and measuring its resistance via 4-point probe or 2-point contact across two parallel busbars. The resistance should stay within the operating bounds of the design and not exceed 10 ohm/square. In addition, the materials used in heating layer 303 should be selected such that the material is below its melting and/or oxidation point in air.

In those or other embodiments, the material(s) used to form heating layer 303 may be configured such that they have the same or similar optical transmission characteristics as window layer 301 in a wavelength range of interest. For example, the materials used to form heating layer 303 may be selected such that they are transparent to IR light within a wavelength range of interest, such as between 0.4-5.0 µm. Alternatively, in embodiments window layer 301 may be configured to transmit light in a specified wavelength range (e.g., it may be IR transparent in a wavelength range of about 0.4 to about 5.0 µm), and heating layer 303 may be opaque to light in that wavelength range. As used herein, the term "opaque" when used in conjunction with light transmission means that a layer or component transmits less than about 10% of light in an indicated wavelength range. In such instances, heating layer 303 may be configured as a sacrificial layer that is removed (e.g., by ablation, flaking, etc.) from seeker window 300 during hypersonic flight and/or during a transition to hypersonic flight. One advantage of this approach is that it allows deposition of lower resistance conductors, which can achieve higher thermal outputs within the available supplied voltage.

The material(s) used to form heating layer 303 may also be selected such that they have a CTE that is substantially matched to the CTE of window layer 301. As used herein, the term "substantially matched" when used in conjunction with CTE means that the CTE of one layer or component is the same as or within +/−10% of the CTE of an another (e.g., adjacent) layer or component. Thus, in the context of seeker window 300, window layer 301 may have a first CTE, and heating layer 303 may have a second CTE that is substantially matched (i.e., within +/−10%) of the first CTE. Without wishing to be bound by theory, it is believed that by substantially matching the CTE of window layer 301 and heating layer 303, physical stress imparted by the different expansion of heating layer 303 and window layer 301 can be reduced and/or eliminated, thereby reducing the risk of mechanical failure of seeker window 300 during acceleration to hypersonic flight.

The materials used as or in heating layer 303 may be selected to have a desired level of thermal conductivity, e.g., to improve the conveyance of heat to window layer 301 and/or to avoid development of hot spots during application of the thermal profile and/or during acceleration to hypersonic flight. In embodiments, heating layer 303 is formed from or includes a heating material that has a thermal conductivity in a range of about 10 to about 300 watts per meter Kelvin (W/mK), such as from about 10 to about 200 W/mK. Such ranges are for the sake of example, and heating layer 303 may have any suitable thermal conductivity.

Non-limiting examples of heating materials that may be used as or in heating layer 303 include metals such as titanium, silver, tungsten, CNTs, combinations thereof, and the like. Without limitation, in embodiments heating layer 303 is formed from or includes CNTs. In those or other embodiments, heating layer 303 is or includes a mesh formed from one or more of titanium, silver, tungsten, and/or CNTs. Without limitation, in embodiments window layer 301 is formed from or includes sapphire and heating layer(s) 303 is or includes a metallic mesh.

Substantial heat is generated as an aircraft accelerates to and flies at hypersonic speeds. If such heat concentrates at a portion of seeker window 300 (i.e., to form a "hot spot"), the structural integrity of seeker window 300 may be compromised—potentially leading to catastrophic failure of the aircraft in which seeker window 300 is installed. With that in mind, seeker window 300 may optionally include one or more heat distribution layers. For example, and as shown in FIG. 3, seeker window 300 may include one or more optional heat distribution layers 305, which may be present on (e.g., directly on) first side 302 and/or second side 304 of window layer 301. Among other things, heat distribution layers 305 may be configured to distribute heat (from an applied thermal profile and/or generated during flight) across a surface of first side 302 and/or second side 304 of window layer 301.

In embodiments heat distribution layer(s) 305 include or are formed from a heat distribution material that has a relatively high thermal conductivity, so that it can efficiently convey heat to a surface of window layer 301 or another layer between it and window layer 301 (e.g., to heating layer 303). In embodiments, heat distribution layer(s) 305 include or are formed from a material with a thermal conductivity in a range of greater than or equal to about 10 W/mK to about 200 W/mK or more, such as from greater than or equal to about 20 W/mK to about 300 W/mK or more. Non-limiting examples of suitable materials that can be used or in as heat distribution layer(s) 305 include CNTs, flexible graphite foil, combinations thereof, and the like. Without limitation, in embodiments seeker window 300 includes at least one heat distribution layer 305, and the heat distribution layer includes or is formed from CNTs. In those or other embodiments, heat distribution layer(s) 305 may be transparent to light in a wavelength range of interest. For example, when window layer 301 is transparent to IR light in a wavelength range (e.g., about 0.4 to about 5.0 μm), heat distribution layer 305 may be transparent to IR light in the same wavelength range.

Figure 4:
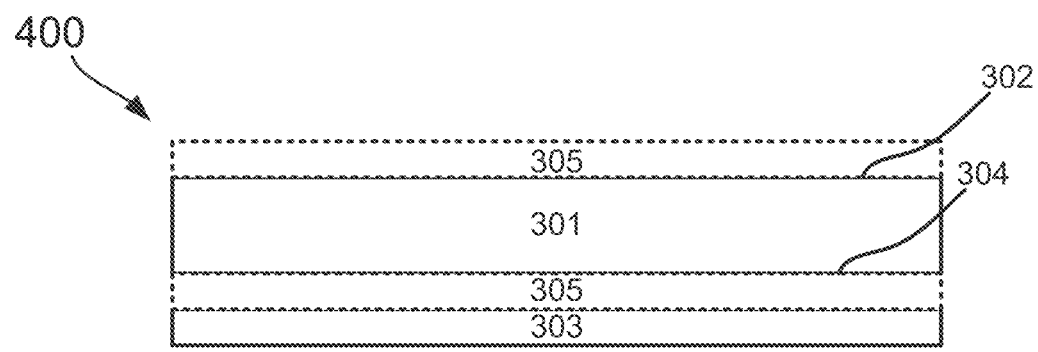
FIG. 4 is a cross section of another example of a seeker window consistent with the present disclosure.
Figure 5:
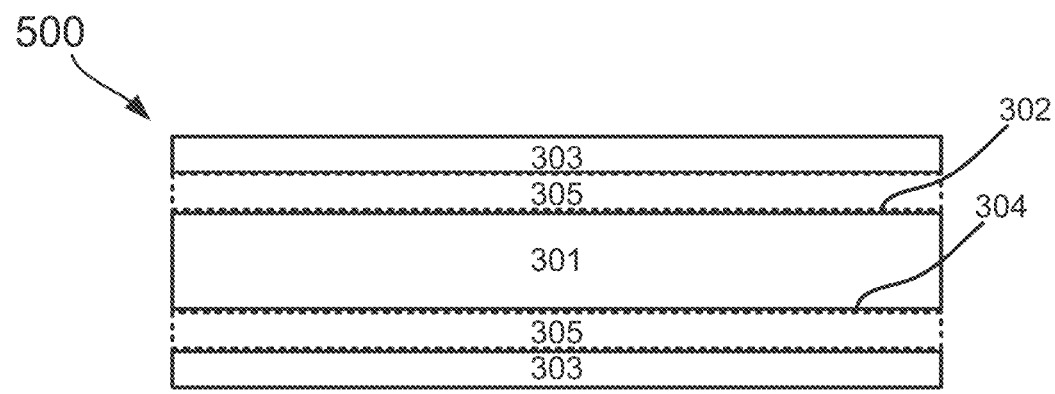
FIG. 5 is a cross section of another example of a seeker window consistent with the present disclosure.

It is noted that FIG. 3 depicts one example of a seeker window in which a single heating layer 303 is used on first side 302, either alone or in combination with an optional heat distribution layer 305 on first side 302 and/or second side 304. Such a configuration is for the sake of example only, and the seeker windows described herein may be configured differently. For example, FIG. 4 depicts a cross section of an example of a seeker window 400 consistent with the present disclosure, wherein heating layer 303 is on second side 304, and is optionally used with one or more heat distribution layers 305. In such instances it should be understood that heating layer 303 is configured to apply a thermal profile to window layer 301 via second side 304 (i.e., from an inside of window layer 301), as opposed to FIG. 3—which used a heating layer 303 that is configured to apply a thermal profile to first side 302 of window layer 301 (i.e., from an outside of window layer 301). Similarly, FIG. 5 depicts a cross section of an example of seeker window 500 that includes two heating layers 303—one on each of first side 302 and second side 304—with an optional heat distribution layer 305 between each heating layer 303 and window layer 301. Such configurations are also for the sake of example, and the seeker windows described herein may be configured differently.

In embodiments the number and position of window layers 301, heating layers 303, and heat distribution layers 305 may vary as needed to achieve a particular design goal. For example, any suitable number of window layers 301 (e.g., 1, 2, 3, 4, 5, 6, etc.) may be used, in combination with any suitable number of heating layers 303 (e.g., 1, 2, 3, 4, 5, 6, 7, etc.) and any suitable number of optional heat distribution layers 305 (e.g., 1, 2, 3, 4, 5, 6, 7, etc.). In instances where multiples of the same layer type are used, such layers may be stacked on each other or interleaved with other layers in any suitable manner.

For the sake of clarity and ease of understanding seeker window 300, seeker window 400, and seeker window 500 (and their corresponding layers) are illustrated in the form of a planar article, but it should be understood that the seeker windows described herein (and their corresponding layers) may have any suitable geometry. For example, seeker windows 300, 400, 500 may have a flat, curved, irregular or any other desired shape, such as, but not limited to, a radome shape.

Figure 6:
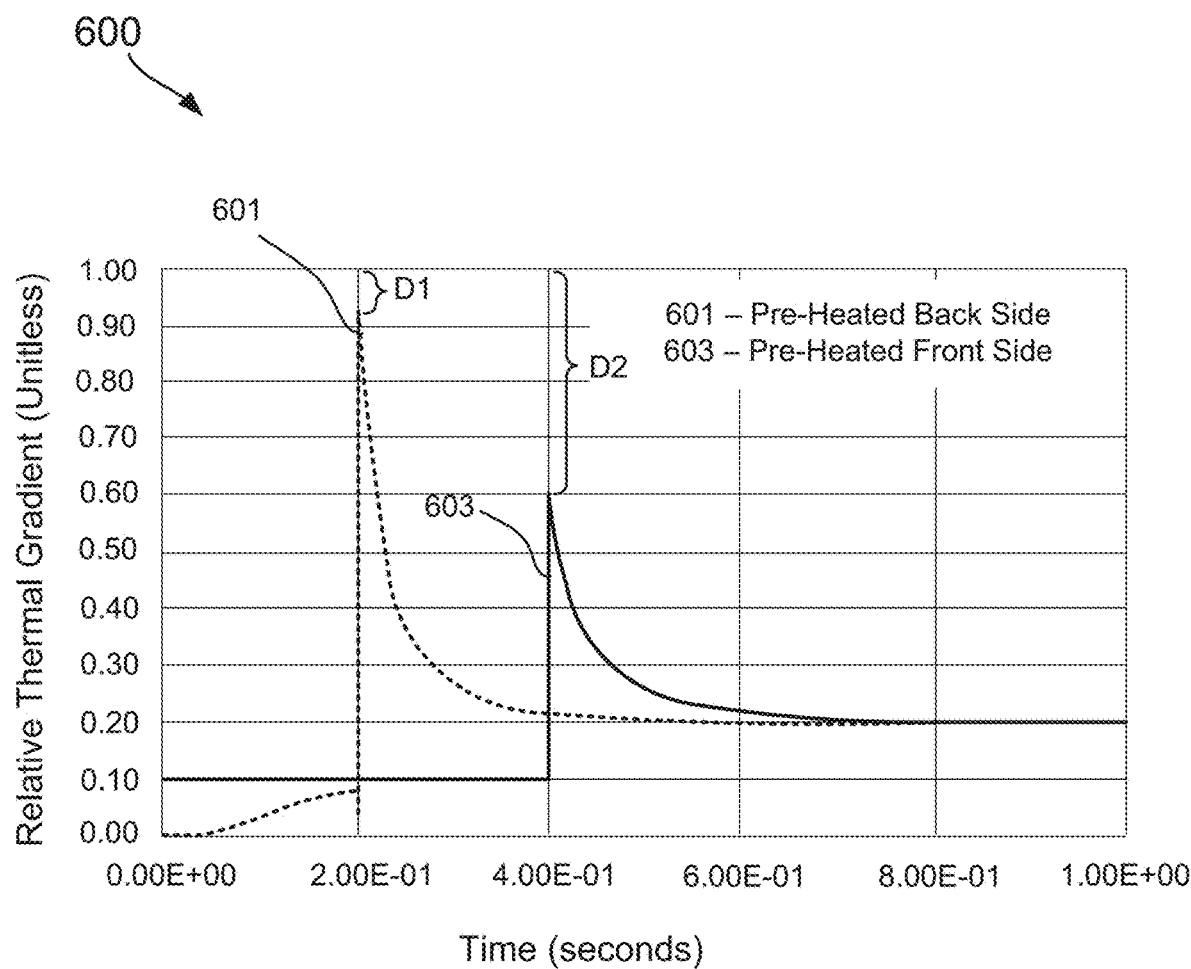
FIG. 6 is a plot of relative thermal gradient versus time demonstrating the impact of application of heating of back side and a front side of a seeker window consistent with the present disclosure.

The inventors have found that application of a thermal profile to the first side 302 and/or second side 304 of window layer 301 can reduce the amount of thermal shock that is experienced by a seeker window. To illustrate this concept simulations were performed based on a seeker window design that included a heating layer on first side 302 (e.g., front) or second side 304 (e.g., back) of a window layer 301. For each simulation, the same thermal profile was applied and allowed to propagate into the window layer 301, albeit from different sides. More specifically, the thermal profile was applied to preheat the window layer 301 from the first side 302 or the second side 304 and allowed to propagate into the window layer 301 before the seeker window was subject to a larger simulated heat pulse that is representative of acceleration to hypersonic flight. The results of the simulations are shown in FIG. 6, which is a plot of relative thermal gradient in the window layer versus time. As can be seen from curve 601, application of the thermal profile to the second side 304 (e.g., back) reduced the thermal gradient experienced by the window layer 301 by an amount D1, which was about 7% (relative to a control). In contrast and as shown by curve 603 application of the thermal profile to the first (front) side 302 reduced the thermal gradient experienced by the window layer by an amount D2, which was about 40% relative to a control.

Figure 8:
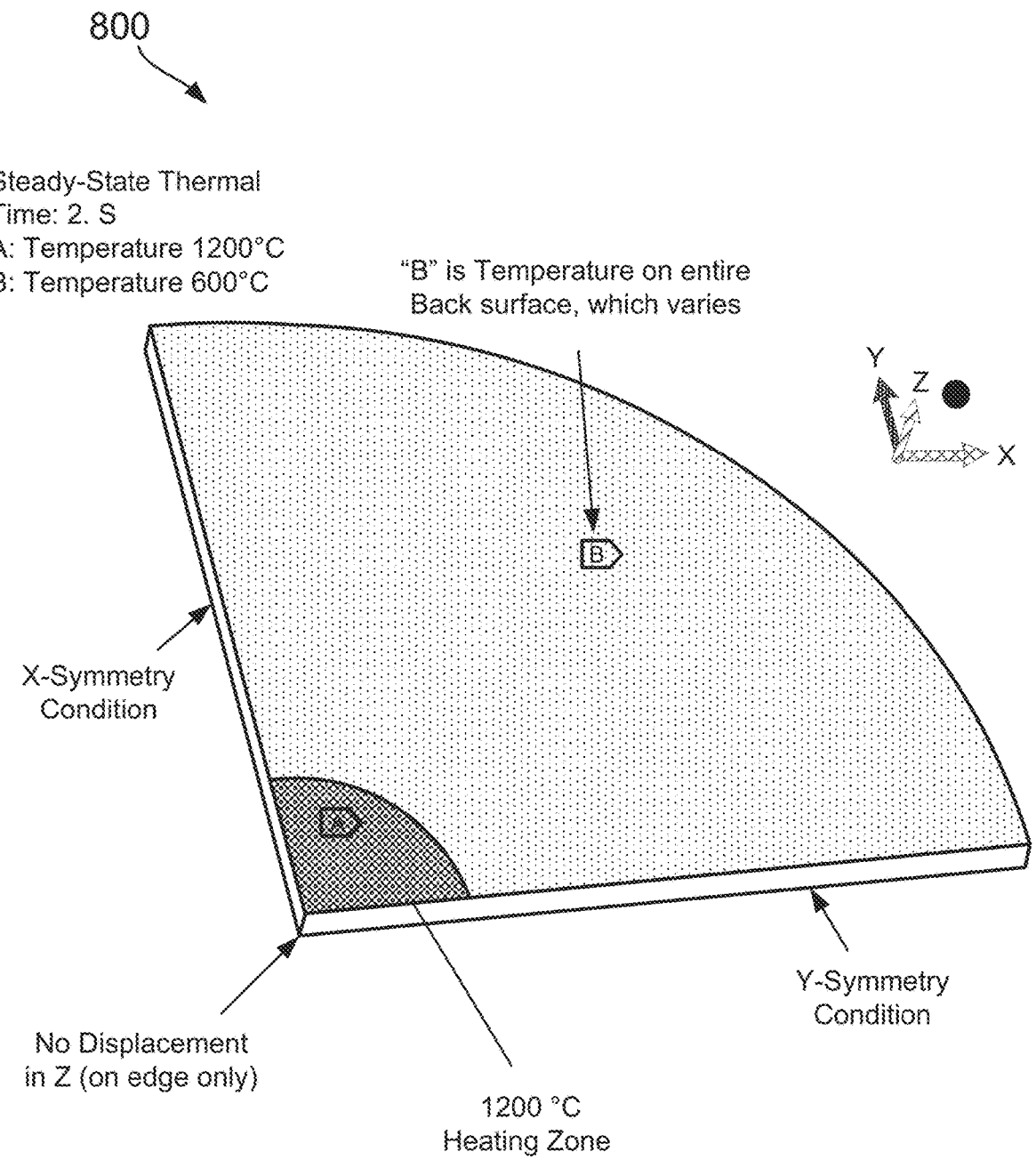
FIG. 8 depicts a quarter model used to perform finite element analysis of a sapphire window layer in a seeker window consistent with the present disclosure.

A finite element analysis (FEA) was performed to further investigate the impact of application of a thermal profile to a seeker window consistent with the present disclosure. More specifically, the FEA was performed using a window layer formed of sapphire having a Young's modulus of 350,000 megapascals (MPa), a Poisson's ratio of 0.265, a tensile strength in a range of 276 to 414 MPa, and a CTE of $9.0*10^{-6}/°$ C. The FEA assumed that the window layer was formed from a linear-elastic, isotropic, and homogenous material that had no defects or cracks and a 17 millimeter "heating zone." The FEA used a steady state analysis (i.e., no time based/transient responses were included) using an unfixtured part (i.e., the geometry of the window layer was not constrained other than by symmetry). A quarter symmetry model (shown in FIG. 8) was used based on the window layer having a thickness of 2 mm or 4 mm and a diameter of 75 mm.

Figure 9:
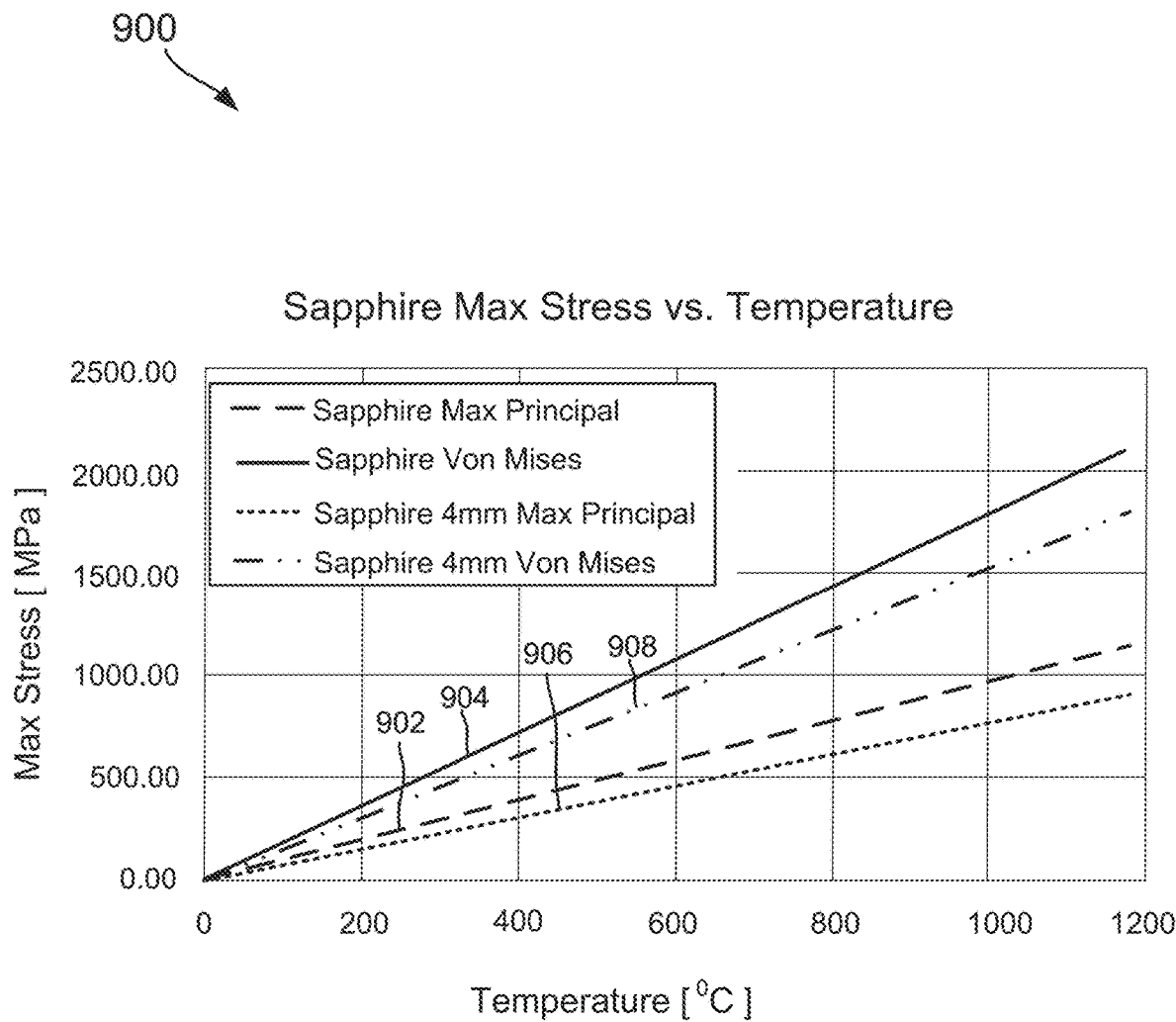
FIG. 9 is a plot of sapphire max stress versus temperature.

The max principal stress and equivalent (von Mises) stress versus temperature on the front surface of the window was determined using the model and is shown in FIG. 9. In the graph of FIG. 9, the maximum principal stress and von Mises stress are shown for both 2 mm and 4 mm thicknesses of sapphire. As shown, the max principal and equivalent stress in the thicker 4 mm window layer, i.e., 4 mm max trace 906 and 4 mm von Mises trace 908, was generally higher than such stress in the thinner 2 mm window layer, i.e., 2 mm max trace 902 and 2 mm von Mises trace 904.

FEA was then run based on the application of a thermal profile to the entire back surface of the window layer, wherein the thermal profile caused the temperature of the entire back surface of the window layer to be heated to 22°

Figure 10:
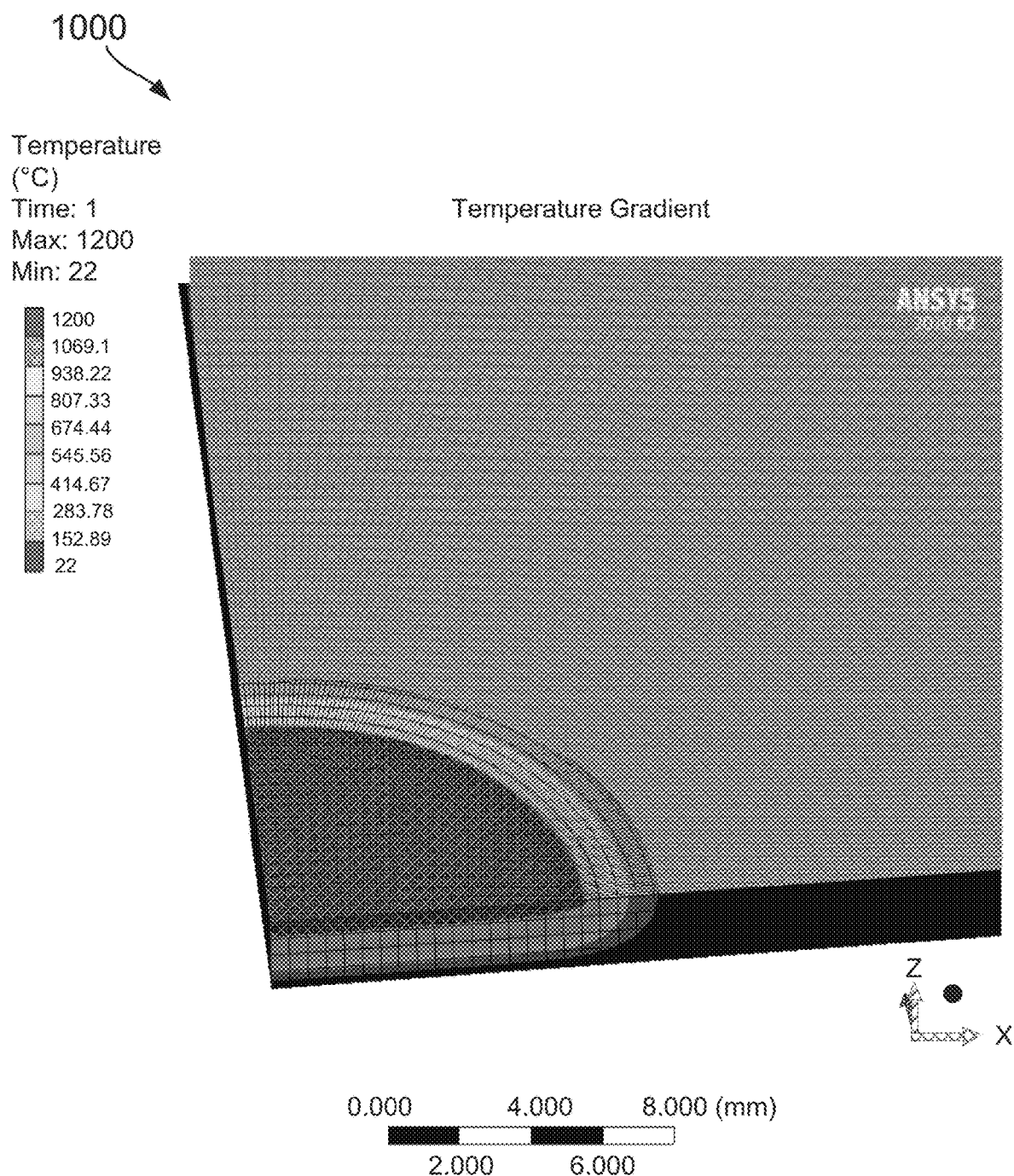
FIG. 10 is a temperature gradient plot of a quarter model of a sapphire window layer in a seeker window consistent with the present disclosure.
Figure 11:
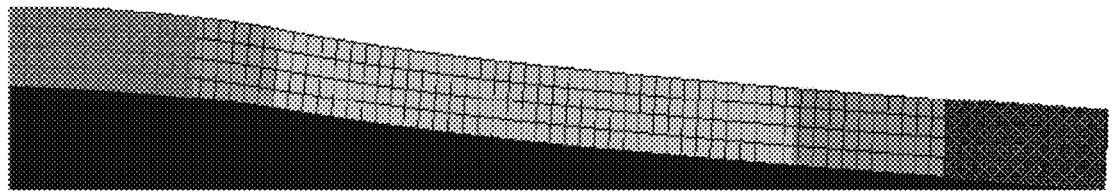
FIG. 11 is a plot of total deformation of a quarter model of a sapphire window layer in a seeker window consistent with the present disclosure.
Figure 12:
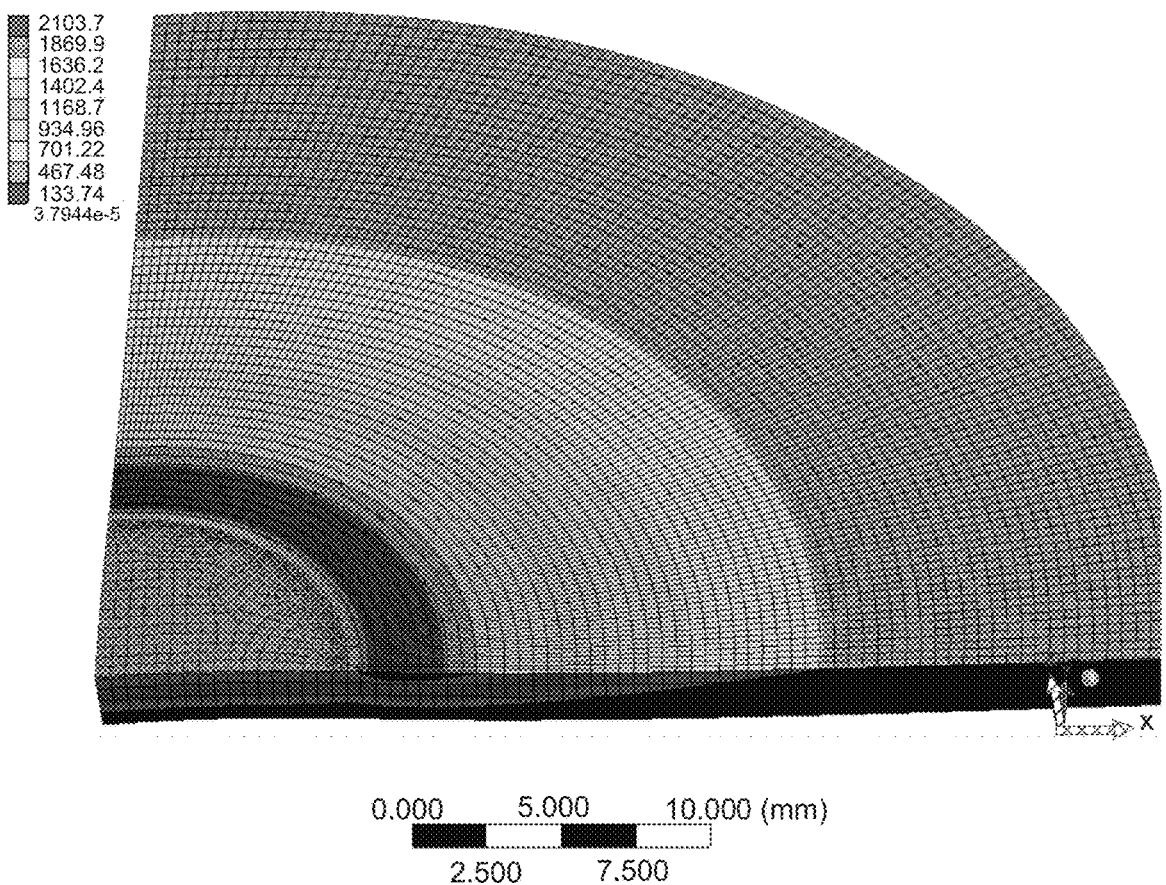
FIG. 12 is a plot of equivalent (von Mises) stress of a quarter model of a sapphire window layer in a seeker window consistent with the present disclosure.
Figure 13:
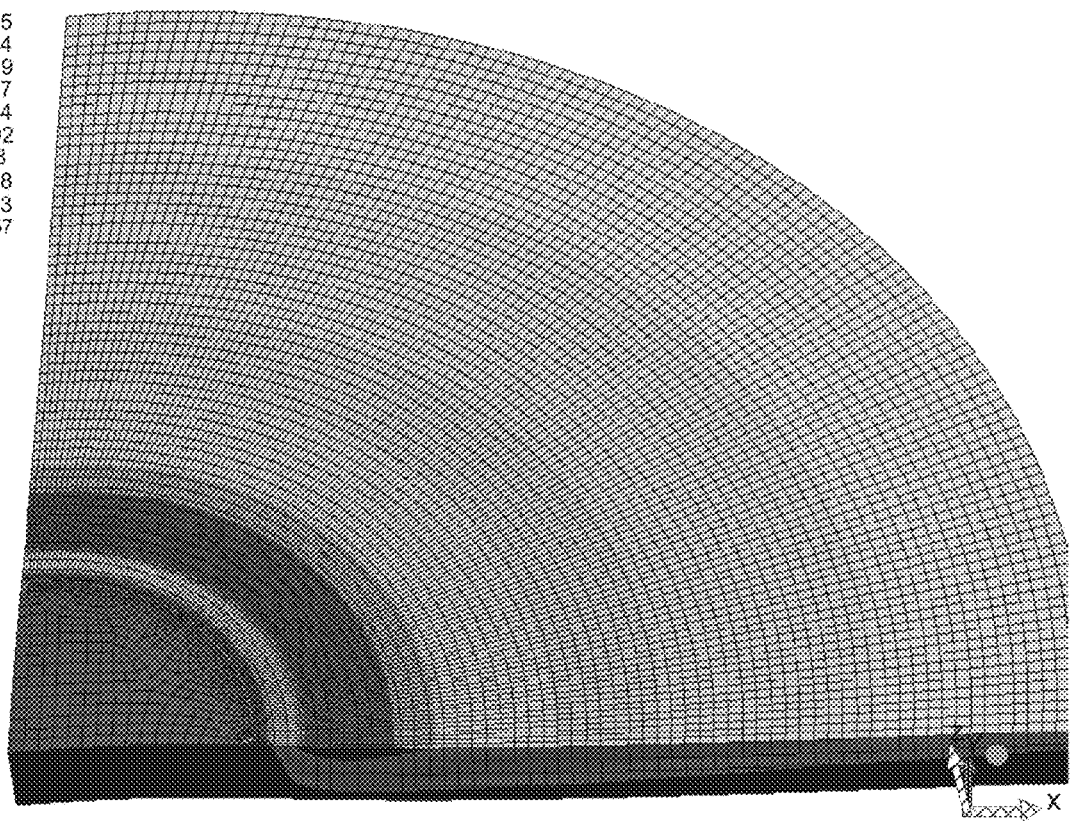
FIG. 13 is a plot of Maximum Principal Stress of a quarter model of a sapphire window layer in a seeker window consistent with the present disclosure.
Figure 14:
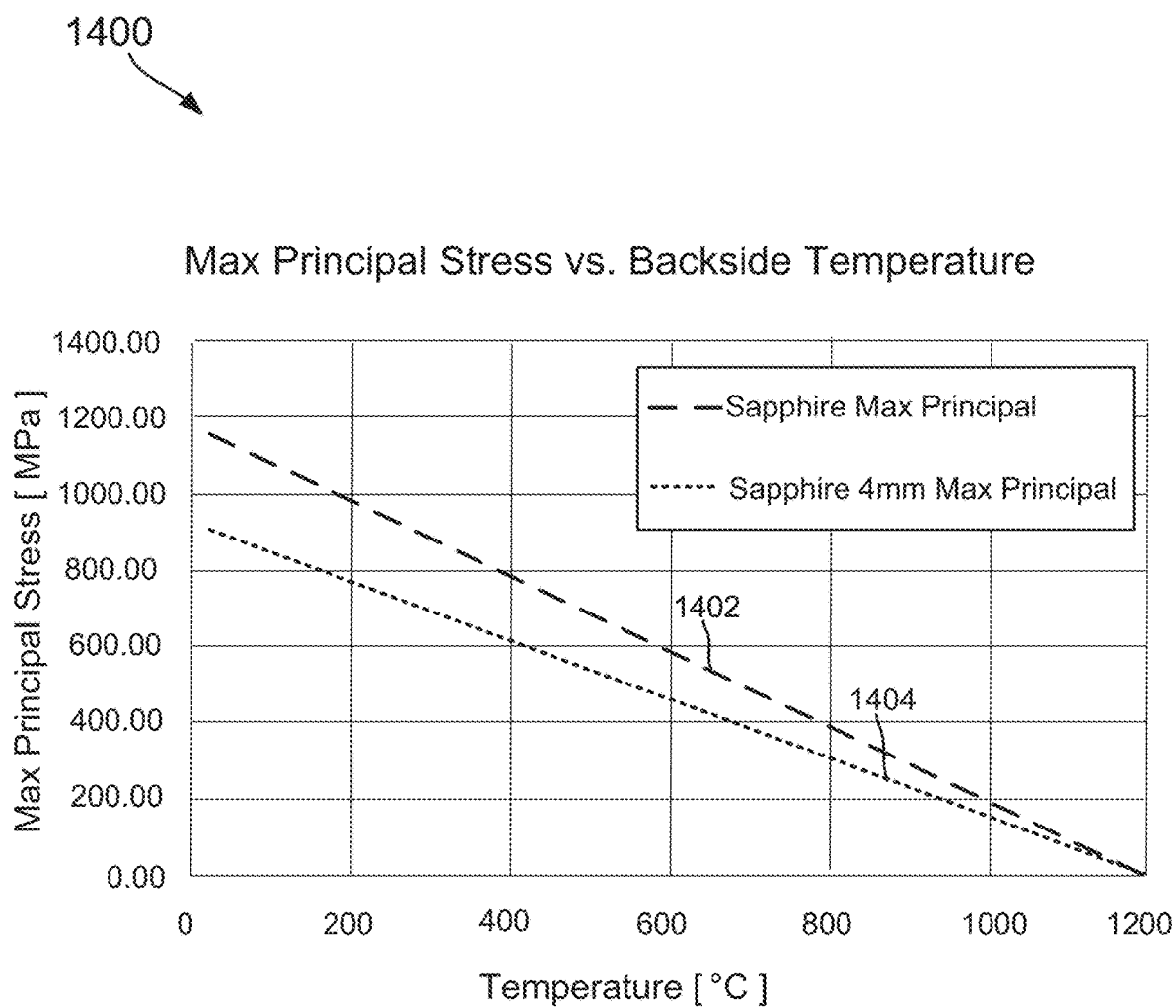
FIG. 14 is a plot of maximum principal stress versus backside temperature of a quarter model of a sapphire window layer in a seeker window consistent with the present disclosure.

C., 600° C., 800° C., 1000° C., and 1200° C., respectively. As there were no geometric constraints (i.e., the window layer was free floating), symmetry was used to constrain the X-Y plane. The Z-axis was constrained by preventing the corner edge of the module from moving. The outer edges were still permitted to flex (deforming from flat into a hyperbolic paraboloid, i.e., a saddle or "potato chip" shape). Temperature gradient and deformation plots were generated from the FEA and are shown in FIGS. 10 and 11, respectively. Equivalent (von Mises) stress and maximum principal stress plots were developed from the FEA and are shown in FIGS. 12 and 13. Finally, the max principal stress versus backside temperature was determined and plotted, as shown in FIG. 14. In the plot of FIG. 14, plot 1402 is the maximum principal stress for the 2 mm sapphire, while plot 1404 is the maximum principal stress for the 4 mm sapphire. The impact of the application of the thermal profile to the backside of the window layer to reduce the thermal shock is shown in table 2 below. By definition, when the stress on a material exceeds the strength of a material, it will crack or otherwise deform. If the Equivalent (von Mises) Stress in Table 2 exceeds the strength in Table 1, the material will crack. The results demonstrate that application of a heating profile that achieves a temperature difference (dT) between the front side and the back side of the window layer in a range of 400-600° C. or less can prevent cracking of the window layer due to thermal shock.

TABLE 2

| Backside T | dT | Maximum Principal Stress (MPa) | | Equivalent (von Mises) Stress (MPa) | |
|---|---|---|---|---|---|
| (° C.) | (° C.) | Sapphire 2 mm | Sapphire 4 mm | Sapphire 2 mm | Sapphire 4 mm |
| 22 | 1178 | 1144.50 | 909.91 | 2103.7 | 1812.2 |
| 600 | 600 | 582.95 | 463.45 | 1071.5 | 923.03 |
| 800 | 400 | 388.64 | 308.97 | 714.32 | 615.35 |
| 100 | 200 | 194.32 | 154.48 | 357.16 | 307.68 |
| 1200 | 0 | 0.0566 | 0.120 | 0.0981 | 0.1887 |

Another aspect of the present disclosure relates to aircraft window systems that include one or more seeker windows consistent the present disclosure. In that regard reference is made to FIGS. 7A and 7B. As best shown in FIG. 7B, window system 700 includes a housing 701, which includes an opening 702 for receiving a seeker window therein. For the sake of illustration, FIG. 7B depicts an example in which housing 701 includes a circular opening 702 for receiving a correspondingly circular shaped seeker window but opening 702 and the seeker windows described herein may have any suitable geometry. For example, opening 702 may have a one, three, four, five, six, or more sided geometric shape, an irregular shape, or a combination thereof.

Figure 7A:
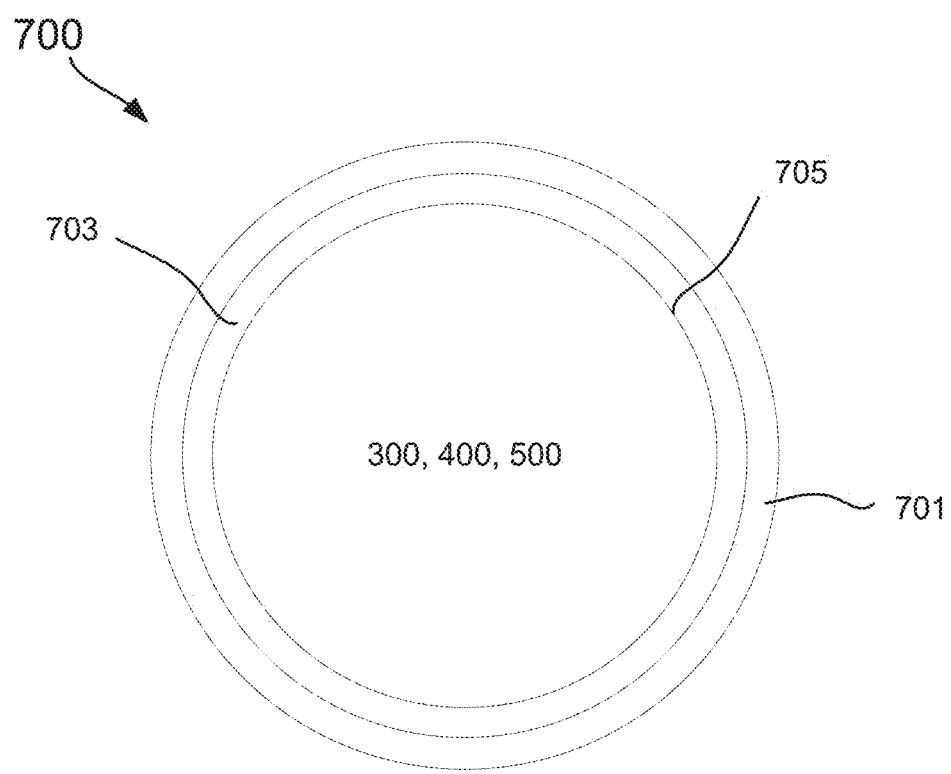
FIG. 7A is a diagram of an example window system including a seeker window consistent with the present disclosure.
Figure 7B:
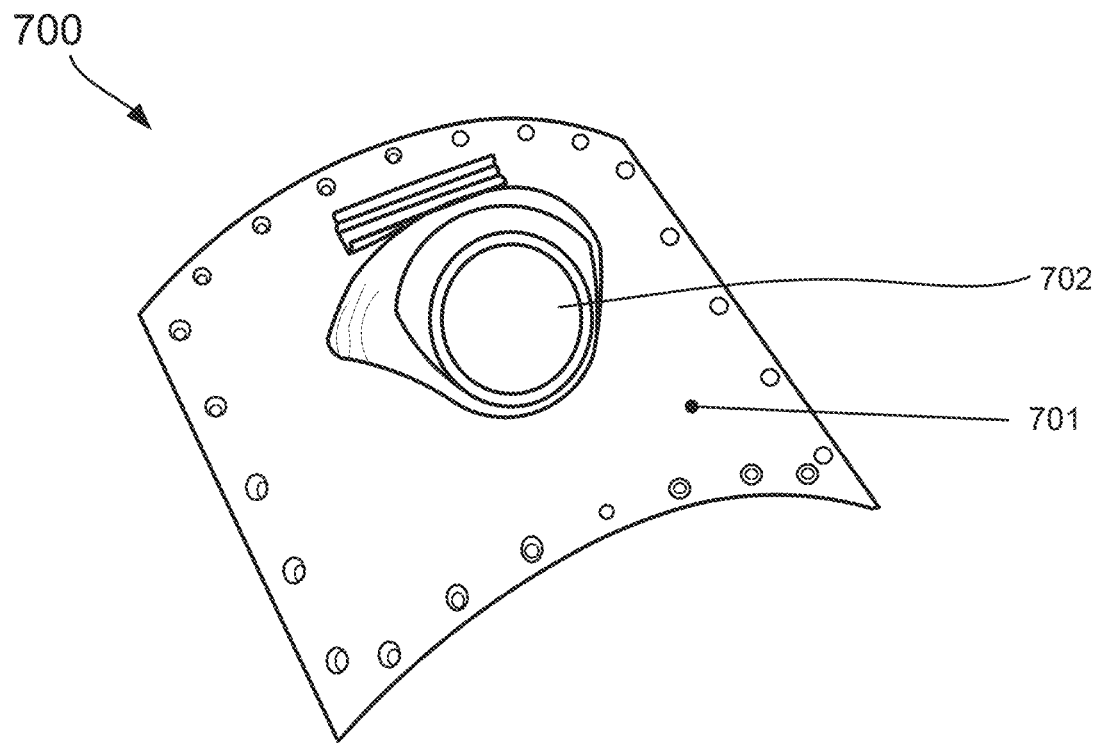
FIG. 7B depicts one example of a housing for a window system consistent with the present disclosure.

As best shown in FIG. 7A, window system 700 further includes a seal 703 between housing 701 and seeker window 300, 400, 500. More specifically and as illustrated in FIG. 7A, seal 703 may be present between at least a portion of a peripheral surface 705 of seeker window 300, 400, 500, and housing 701. Without limitation, seal 703 preferably extends around at least a portion, and preferably all, of peripheral surface 705 of seeker window 300, 400, 500.

In addition to forming a physical seal between peripheral surface 705 and housing 701, seal 703 may also function to convey heat away from seeker window 300, 400, 500 and to housing 701. In that regard, seal 703 may be a thermally conductive seal that is configured to convey heat from seeker window 300, 400, 500 to housing 701, thereby reducing the heat load on seeker window 300, 400, 500, e.g., during hypersonic flight. Without limitation, seal 703 may have a thermal conductivity (Tc) ranging from greater than 0 to about 200 W/mK, such as about 10 to about 150 W/mK, or even from about 50 to about 150 W/mK. Without limitation, in embodiments seal 703 may have directionally dependent thermal conductivity properties. For example, seal 703 may have a first thermal conductivity along a length dimension and a second thermal conductivity in a thickness direction, wherein the first thermal conductivity is greater than the second thermal conductivity. In embodiments the first thermal conductivity ranges from about 100 to about 105 W/mK and the second thermal conductivity is less than about 20 W/mK, such as less than about 10 W/mK or even less than or equal to about 5 W/mK.

Non-limiting examples of materials that may be used as or in seal 703 include flexible graphite foil (e./g., GRAFOIL®), and the like.

Existing solutions often have issues with adhesion of the heating layer to the window layer. Varying resistance gives rise to hot spots and debonding. One of the issues with current techniques is getting the ceramic material to sufficiently wet to allow the braze alloy to adhere. To avoid the problem of hot spots and debonding, in some embodiments the present disclosure replaces the physical bonds at these interfaces with metallurgical or diffusion bonds to enhance bond strength and resistance homogeneity.

The embodiment disclosed herein uses a partial diffusion bond to increase the adhesion of the heating layer to the window layer and may also be used for the buss bars that connect to the heating layer. Diffusion bonding is a solid-state welding technique capable of joining similar and dissimilar materials. It operates on the principle of solid-state diffusion, wherein the atoms of two solid surfaces intersperse themselves over time. This is typically accomplished at an elevated temperature, approximately 50-75% of the absolute melting temperature of the materials. This increases the robustness of the IR window heating layer by forming a metallurgical bond between the heating layer and the window layer. The metallurgical bond increases the strength of the interface.

In some embodiments, titanium is used for the heating layer. By heat treating the window layer after metallization to a temperature near, but below, the melting point, the titanium will diffuse into the window layer and form a diffusion bond which is much less prone to delaminating. Titanium is commonly used as a bond coat when brazing ceramics to metals.

To increase ease of processing, an additional metal can be applied over the top of the titanium layer to form a eutectic alloy with a lower melting point. In some embodiments, a metal such as silver would alloy with the titanium and reduce the melting point while remaining conductive. Other metals, such as gold, can also be used, but a silver-titanium alloy will have a lower melting point and lower cost than a gold-titanium alloy. In other embodiments, any other suitable metal can be alloyed with the titanium as would be known to one skilled in the art.

According to one aspect of the present disclosure, there is thus provided a seeker window for an aircraft comprises a window layer comprising an IR transparent material, the window layer comprising a first side and a second side substantially opposite the first side; and a heating layer on the first side or the second side of the window layer, the heating layer configured to apply a heating profile to the window layer to reduce thermal shock imparted to the window layer when the seeker window is exposed to hypersonic flight conditions.

According to another aspect of the disclosure, there is provided a system for an aircraft window comprises a housing comprising an opening; a seeker window in the opening, the seeker window comprising window layer comprising a first side, a second side substantially opposite the first side, and a perimeter surface; and a seal between the perimeter surface and the housing; where the window layer comprises an IR transparent material; and the seeker window further comprises a heating layer on the first side or the second side of the window layer, the heating layer configured to apply a heating profile to the window layer to reduce thermal shock imparted to the window layer when the seeker window is exposed to hypersonic flight conditions.

According to yet another aspect of the disclosure there is provided a seeker window for an aircraft comprises a window layer comprising an IR transparent material, the window layer comprising a first side and a second side substantially opposite the first side; and a heating layer on the first side or the second side of the window layer; where the heating layer is adhered to the window layer using a partial diffusion bond.

From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

What is claimed is:

1. A seeker window for an aircraft, comprising:
a window layer comprising an IR transparent material, the window layer comprising a first side and a second side substantially opposite the first side; and
a heating layer on the first side or the second side of the window layer, the heating layer configured to apply a heating profile to the window layer to reduce thermal shock imparted to the window layer when the seeker window is exposed to hypersonic flight conditions.

2. The seeker window of claim 1, wherein the IR transparent material is selected from a group consisting of sapphire, yttria ($Y_2O_3$), ZnS, AlON, spinel, fused silica, germanium, GaAs, diamond, MgO, yttria stabilized zirconia (YSZ), yttria aluminum garnet (YAG), MgO—$Y_2O_3$, $Al_2O_3$—YSZ, $Al_2O_3$—YSZ—$Y_2O$, AlN, $Si_3N_4$, and combinations thereof.

3. The seeker window of claim 1, wherein the heating layer comprises a metallic mesh.

4. The seeker window of claim 1, wherein the heating layer comprises a heating coating.

5. The seeker window of claim 1, wherein the heating layer comprises titanium, silver, tungsten, carbon nanotubes, or a combination of two or more thereof.

6. The seeker window of claim 1, wherein the window layer has a first coefficient of thermal expansion (CTE), and the heating layer has a second CTE that differs from the first CTE by less than or equal to about 10%.

7. The seeker window of claim 1, further comprising a heat distribution layer on the first side or the second side of the window layer.

8. The seeker window of claim 7, wherein the heat distribution layer is between the window layer and the heating layer.

9. The seeker window of claim 7, wherein the heating layer is between the window layer and the heat distribution layer.

10. The seeker window of claim 7, wherein the heating layer is on the first side of the window layer and the heat distribution layer is on the second side of the window layer.

11. An aircraft window system, comprising:
a housing comprising an opening;
a seeker window in the opening, the seeker window comprising window layer comprising a first side, a second side substantially opposite the first side, and a perimeter surface; and
a seal between the perimeter surface and the housing;
wherein:
the window layer comprises an IR transparent material; and
the seeker window further comprises a heating layer on the first side or the second side of the window layer, the heating layer configured to apply a heating profile to the window layer to reduce thermal shock imparted to the window layer when the seeker window is exposed to hypersonic flight conditions.

12. The system of claim 11, wherein the IR transparent material is selected from a group consisting of sapphire, yttria ($Y_2O_3$), ZnS, AlON, spinel, fused silica, germanium, GaAs, diamond, MgO, yttria stabilized zirconia (YSZ), yttria aluminum garnet (YAG), MgO—$Y_2O_3$, $Al_2O_3$—YSZ, $Al_2O_3$—YSZ—$Y_2O$, AlN, $Si_3N_4$, and combinations thereof.

13. The system of claim 11, wherein the heating layer comprises a metallic mesh.

14. The system of claim 11, wherein the heating layer comprises a heating coating.

15. The system of claim 11, wherein the heating layer comprises titanium, silver, tungsten, carbon nanotubes, or a combination of two or more thereof.

16. The system of claim 11, wherein the window layer has a first coefficient of thermal expansion (CTE), and the heating layer has a second CTE that differs from the first CTE by less than or equal to about 10%.

17. A seeker window for an aircraft, comprising:
a window layer comprising an IR transparent material, the window layer comprising a first side and a second side substantially opposite the first side; and
a heating layer on the first side or the second side of the window layer,
wherein:
the heating layer is adhered to the window layer using a partial diffusion bond.

18. The seeker window of claim 17, wherein the heating layer comprises titanium.

19. The seeker window of claim 18, wherein:
an additional metal is used to improve adhesion of the heating layer to the window layer; and
the additional metal forms an alloy with the titanium to reduce a melting point of the titanium.

20. The seeker window of claim 19, wherein:
the additional metal is silver or gold; and
the alloy formed is a eutectic alloy or a peritectic alloy.

* * * * *